United States Patent
Greyson et al.

(10) Patent No.: US 11,097,307 B2
(45) Date of Patent: Aug. 24, 2021

(54) METHOD FOR PREPARING A UV CURABLE COATING COMPOSITION

(71) Applicants: Dow Global Technologies LLC, Midland, MI (US); Rohm and Haas Company, Collegeville, PA (US)

(72) Inventors: Eric C. Greyson, Blue Bell, PA (US); Charles R. Hegedus, Allentown, PA (US); Andrew Hejl, Lansdale, PA (US); Rebecca L. Ladewski, Midland, MI (US); Erin B. Vogel, Midland, MI (US); Wenqin Wang, Phoenixville, PA (US)

(73) Assignees: Dow Global Technologies LLC., Midland, MI (US); Rohm and Haas Company, Collegeville, PA (US)

( * ) Notice: Subject to any disclaimer, the term of this patent is extended or adjusted under 35 U.S.C. 154(b) by 265 days.

(21) Appl. No.: 16/432,096

(22) Filed: Jun. 5, 2019

(65) Prior Publication Data
US 2019/0366379 A1     Dec. 5, 2019

Related U.S. Application Data

(60) Provisional application No. 62/680,772, filed on Jun. 5, 2018.

(51) Int. Cl.
| | |
|---|---|
| *C08F 20/32* | (2006.01) |
| *C08F 2/38* | (2006.01) |
| *C08F 2/48* | (2006.01) |
| *B05D 3/06* | (2006.01) |

(52) U.S. Cl.
CPC ............... *B05D 3/067* (2013.01); *C08F 2/38* (2013.01); *C08F 2/48* (2013.01); *C08F 20/32* (2013.01); *B05D 2301/00* (2013.01); *B05D 2320/00* (2013.01); *B05D 2502/00* (2013.01)

(58) Field of Classification Search
CPC . B05D 3/067; C08F 20/32; C08F 2/38; C08F 2/48
USPC ........................................................ 524/501
See application file for complete search history.

(56) References Cited

U.S. PATENT DOCUMENTS

| | | |
|---|---|---|
| 6,586,097 B1 | 7/2003 | Pascault et al. |
| 6,730,733 B2 | 5/2004 | Overbeek et al. |
| 6,881,769 B1 | 4/2005 | Grob et al. |
| 6,910,663 B1 | 6/2005 | Wubben et al. |
| 7,470,751 B2 | 12/2008 | Taylor et al. |
| 7,947,760 B2 | 5/2011 | Janmaat et al. |
| 9,574,101 B2 | 2/2017 | Hejl et al. |
| 2015/0166702 A1 | 6/2015 | Debling et al. |
| 2017/0096588 A1* | 4/2017 | Demoulin ............ C08F 265/06 |

FOREIGN PATENT DOCUMENTS

KR      2016113387      3/2018

* cited by examiner

*Primary Examiner* — Deve V Hall
(74) *Attorney, Agent, or Firm* — Reid S. Willis

(57) ABSTRACT

The present invention relates to a method comprising the steps of: a) contacting an acrylate monomer, a carboxylic acid monomer, and a chain transfer agent under free radical polymerization conditions to form a solution of a polymer having an $M_n$ in the range of from 5,000 to 50,000 Daltons; b) contacting the solution with a base and an ethylenically unsaturated glycidyl functionalized monomer to form a solution of an ethylenically unsaturated acrylate polymer; c) contacting the solution of the ethylenically unsaturated functionalized acrylate polymer with water to form an aqueous dispersion of ethylenically unsaturated functionalized acrylate polymers; and d) removing the organic solvent. The method of the present invention provides a composition suitable for use as a UV curable coating that achieves an excellent balance of hardness, flexibility, and warmth with less reliance on costly MFAs.

7 Claims, No Drawings

METHOD FOR PREPARING A UV CURABLE COATING COMPOSITION

BACKGROUND OF THE INVENTION

The present invention relates to a UV coating composition that is useful for coating a substrate such as wood, metal, plastic, and masonry. Waterborne acrylic coatings are known to show significantly poorer chemical resistance and hardness (and other properties related to crosslink density) than alternatives such as 2-component solvent-borne coatings or UV-curable waterborne polyurethane dispersions (WB-PUDs). Acrylic coating compositions that are UV-curable have been useful in making better performing coating compositions for use on wood; moreover, dispersions such as urethane-acrylic hybrid compositions have been used to provide coatings with acceptable finishes on wood. To provide a mechanism for UV cure, and thereby improve the physical properties of the coating, U.S. Pat. No. 9,574,101 discloses the use of high levels of a multifunctional acrylate (MFA) to be used in combination with the acrylic dispersion to further improve the properties of the coating. MFAs, however, do have drawbacks: Trifunctional MFAs such as trimethylolpropane trimethacrylate, though readily transportable to the host latex particles, are skin sensitizers and therefore practically unsuitable; MFAs with higher acrylate functionality such as dipentaerythritol pentaacrylate are generally required to be used at higher concentrations to achieve acceptable hardness. Since these high concentrations of MFAs cause brittleness in the coating, it would be an advance in the art of UV-curable coatings to find a UV-curable waterborne acrylic composition that gives coatings with excellent hardness and flexibility.

SUMMARY OF THE INVENTION

The present invention is a method comprising the steps of: a) contacting, under free radical polymerization conditions and in the presence of an organic solvent, an acrylate monomer, a carboxylic acid monomer, and a chain transfer agent, to form a solution of a polymer having an $M_n$ in the range of from 5,000 to 50,000 Daltons; b) contacting the solution with a base and an ethylenically unsaturated glycidyl functionalized monomer to form a solution of an ethylenically unsaturated acrylate polymer; c) contacting the solution of the ethylenically unsaturated acrylate polymer with water to form an aqueous dispersion of ethylenically unsaturated functionalized acrylate polymer particles; and d) removing the organic solvent.

The method of the present invention provides a composition suitable for use as a UV curable coating that achieves an excellent balance of hardness, flexibility, and warmth with less reliance on costly MFAs.

DETAILED DESCRIPTION OF THE INVENTION

The present invention is a method comprising the steps of: a) contacting, under free radical polymerization conditions and in the presence of an organic solvent, an acrylate monomer, a carboxylic acid monomer, and a chain transfer agent, to form a solution of a polymer having an $M_n$ in the range of from 5,000 to 50,000 Daltons; b) contacting the solution with a base and an ethylenically unsaturated glycidyl functionalized monomer to form a solution of an ethylenically unsaturated acrylate polymer; c) contacting the solution of the ethylenically unsaturated acrylate polymer with water to form an aqueous dispersion of ethylenically unsaturated functionalized acrylate polymer particles; and d) removing the organic solvent.

As used herein, the term "an acrylate monomer" refers to one or more acrylate or methacrylate monomers. The term "structural units" is used to describe the remnant of the recited monomer after its incorporation into the polymer backbone. For example, a structural unit of methyl acrylate is illustrated by the following structure:

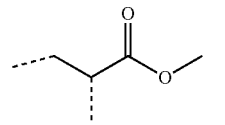

Structural unit of methyl acrylate where the dotted line represented the points of attachment of the structural unit to the polymer backbone.

Examples of acrylate monomers include methyl acrylate, ethyl acrylate, n-butyl acrylate, 2-ethylhexyl acrylate, methyl methacrylate, and n-butyl methacrylate, with methyl acrylate being preferred. The concentration of structural units of the acrylate monomer is preferably in the range of from 84 to 92 weight percent, based on the weight of the structural units of the acrylate monomer and the carboxylic acid monomer.

Examples of carboxylic acid monomers include acrylic acid, methacrylic acid, and itaconic acid. The concentration of structural units of the carboxylic acid monomer is preferably in the range of from 8 to 16 weight percent, based on the weight of the structural units of the acrylate monomer and the carboxylic acid monomer.

Preferably, from 30 percent to 90, more preferably to 80 percent of the structural units of the carboxylic acid monomer are functionalized with an ethylenically unsaturated glycidyl functionalized monomer (GFM) such as glycidyl methacrylate (GMA), glycidyl acrylate, allyl glycidyl ether, or 4-hydroxybutyl acrylate glycidyl ether, to form an ethylenically unsaturated adduct, an example of which is illustrated:

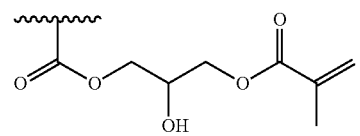 [SMILES: *C(=O)OCC(O)COC(=O)C(=C)C]

Structural unit of a carboxylic acid functionalized glycidyl methacrylate adduct where the squiggly line represents the polymer backbone.

It is preferred that carboxylic acid groups that are not functionalized with the GFM are incompletely neutralized. Preferably, from about 40 to 80% of the non-functionalized carboxylic acid groups are in the form of a carboxylate salt, such as a lithium, a sodium, a potassium, an ammonium, or a mono-, di-, or trialkylammonium salt.

The polymer particles preferably include a remnant of a chain transfer agent (CTA), preferably an alkylmercaptan such as n-dodecylmercaptan, at a concentration preferably in the range of from 0.2, more preferably from 0.5 to preferably 5, more preferably to 3, and most preferably to 2 weight percent, based on the weight of the structural units of the acrylate monomer the carboxylic acid monomer and the CTA. A remnant of n-dodecylmercaptan is illustrated as follows:

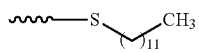

The polymer particles have a number average molecular weight ($M_e$) in the range of 5,000, preferably from 10,000 Daltons, to 50,000, preferably to 30,000 Daltons, as determined by gel permeation chromatography using tetrahydrofuran solvent measured against polystyrene standards. The polymer particles are also preferably single phase particles that preferably comprise a substantial absence of structural units of a multiethylenically comonomer. As used herein, the term "substantial absence of structural units of a multiethylenically unsaturated comonomer" refers to less than 0.09, preferably less than 0.01, and most preferably 0 weight percent structural units of a multiethylenically unsaturated comonomer such as divinyl benzene or allyl methacrylate. Furthermore, the dispersed polymer particles are completely soluble in the organic solvent used to prepare the GFM-functionalized polymer. Preferably, the GFM-functionalized polymer, more preferably the GMA-functionalized polymer, is soluble in methylethyl ketone at a concentration of at least 100 g/L.

The composition optionally comprises an MFA, which has an average acrylate functionality of at least 2, preferably at least 3. Examples of suitable MFAs include ditrimethylolpropane tetraacrylate, dipentaerythritol pentaacrylate, and dipentaerythritol hexaacrylate. Preferably, the composition comprises from 1, more preferably from 10 to 50, more preferably to 40, and most preferably to 35 weight percent of the MFA based on the weight of the ethylenically unsaturated functionalized polymer, chain transfer agent, and the MFA.

The composition may further include dispersed polymer particles that are not functionalized with the GFM, preferably glycidyl methacrylate. Preferably, ancillary polymer particles have an $M_n$ in the range of from 50,000 to 1,000,000 Daltons. In another aspect of the present invention, the composition comprises functionalized polymer particles and non-functionalized polymer particles at a functionalized to non-functionalized w/w ratio in the range of from 60:40, more preferably from 65:35 to 95:5, more preferably to 80:20, and most preferably to 75:25.

A preferred composition of the present invention is advantageously prepared as follows: In a first step, a reactor is charged with an organic solvent having a boiling point above 70° C. Examples of suitable organic solvents include an ethylene glycol ether, an ethylene diglycol ether, ethyl acetate, butyl acetate, methylethyl ketone, toluene, and xylene. The reactor is heated with stirring to a temperature suitable to promote free radical polymerization of the acrylate and carboxylic acid monomers, typically from 75° C. to 95° C., after which time the monomers, the CTA, and the initiator are charged into the reactor. Heating is continued until polymerization is complete. The temperature of the contents is reduced to ~70° C. whereupon from about 1 to 1000 ppm of an inhibitor such as (2,2,6,6-tetramethylpiperidin-1-yl)oxyl (TEMPO) is added to inhibit further polymerization. A base such as triethylamine is then added to the reactor, followed by addition of the GFM, which is preferably glycidyl methacrylate. The temperature of the reactor is then raised to a sufficient temperature to promote reaction of the GFM and the carboxylic acid groups (~80° C.). After this reaction is substantially complete, an MFA such as dipentaerythritol pentaacrylate is preferably added, and the reactor temperature is reduced to ~60° C. The contents of the reactor are then conveniently transferred to a kettle containing water, optionally in the presence of a surfactant, and the organic solvent is removed in vacuo so that the levels of solvents are reduced preferably to less than 5000 ppm, and more preferably to less than 2000 ppm. If desired, a latex that is not functionalized with a GFM can be combined with the functionalized latex at this time.

The incorporation of the MFA into the host functionalized polymer particles is promoted by adding the MFA to the organic solvent borne polymeric dispersion. Thus, even very hydrophobic MFAs such as dipentaerythritol pentaacrylate readily transfer to the polymer particles.

The composition of the present invention can be formulated into a UV-curable composition with the aid of a photoinitiator, examples of which include α-hydroxyketones such as 2-hydroxy-2-methyl-1-phenyl-propan-1-one, 2-hydroxy-2-methyl-1-phenyl-acetone, and 1-hydroxyl-cyclohexyl phenyl acetone; benzophenones; and mono- and diacyl phosphines. Other examples of suitable photoinitiators are disclosed in U.S. Pat. No. 9,574,101, column 7, lines 43-54. The concentration of photoinitiator is typically in the range of 0.5 to 4 weight percent, based on the weight of total solids in the composition.

The composition of the present invention may also include one or more additives selected from the group consisting of coalescents, surfactants, defoamers, Zn salts, and rheology modifiers. Coatings prepared from the composition of the present invention show an excellent balance of properties that are desired for wood coating applications, including pencil hardness, mandrel bend, and chemical resistance.

EXAMPLES

Compositions of the present invention and comparative compositions were applied as coatings to aluminum panels and tested for pencil hardness and mandrel bend and also applied to wood panels and tested for chemical resistance.

Coated Sample Preparation

The formulated samples were drawn down on chromate pretreated aluminum panels using a 5-mil latex film applicator. The films were dried at room temperature for 15 min, oven dried at 60° C. for 10 min, and then cooled to room temperature before UV Cure. The panels were cured in a UV curing apparatus using an "H" type Bulb to a total dosage of 1.2 J/cm².

Pencil Hardness Test

Pencil hardness was performed in accordance with ASTM D3363-05 (2001)e2, Standard Test Method for Film Hardness by Pencil Test. The hardness was reported as the hardest lead that will leave the film uncut for a stroke length of ⅛". The rating system is H, 2H, and 3H, with 3H being the best rating.

Mandrel Bend

The flexibility of the film coated on phosphate treated aluminum panels was evaluated as follows: A 1.2×10-cm test specimen was prepared by cutting the aluminum panel on a metal cutter. Sufficient force was applied suddenly to bend the panel 180° over the mandrel starting with the largest diameter. The smallest diameter at which sample does not show any cracks was recorded. A mandrel bend of ⅛" means that no cracking was observed on the ⅛" mandrel.

Chemical Resistance

Chemical resistance (1 h) was performed using 50% ethanol, isopropyl alcohol, n-butyl acetate, methylethyl ketone, and hot water; 16-h chemical resistance was performed using Formula 409 Cleaner, Red Ink, and 50% ethanol; and 6-h chemical resistance was performed with coffee. A 23-mm diameter Whatman filter paper was placed on the coating and covered with the chemical; the chemical spots were then covered with caps to abate evaporation during the test. After the duration of the test, the residual chemical was wiped off and the panels were rated immediately based on the damage to the film on a 1 to 10 scale. Values of 1-3 indicate obvious film damage; 4-7 indicated more to less obvious film damage; and Values of 8-9 indicate subtle appearance/gloss changes visible only from selected angles. A value of 10 indicates no change. All samples tested showed chemical resistance against all samples of 9-10 with one exception: the MA/MFA sample showed a chemical resistance of 7 against methylethyl ketone.

Example 1—Preparation of an Acrylate Polymer Functionalized with Glycidyl Methacrylate A reactor was charged with methylethyl ketone (MEK, 405.78 g) and heated to 80° C. with stirring. A monomer mix was prepared by combining methyl acrylate (736.80 g), methyl methacrylate (96.00 g), methacrylic acid (117.60 g), and n-dodecylmercaptan (9.60 g) in one vessel, and an initiator mix was prepared by combining Trigonox 25C75 initiator (16.00 g) with MEK (176.00 g) in a separate vessel. The monomer and initiator mixes were charged into the reactor starting at the same time, with the monomer mix being fed over 120 min and the initiator mix being fed over 150 min. The temperature of the reactor was maintained at 80° C. over the course of the additions. Upon completion of addition of the mixes, both vessels were rinsed with MEK (64 g and 20 g for the monomer mix vessel and the initiator mix vessel, respectively), and heating of the reactor was continued for an additional 120 min at 80° C. The reactor was cooled to 70° C., at which temperature the reactor was charged sequentially with a solution of (2,2,6,6-tetramethylpiperidin-1-yl)oxyl (TEMPO, 0.48 g) in MEK (9.12 g), triethylamine (25.57 g), glycidyl methacrylate (122.40 g), then tetrabutylammonium bromide (12.19 g). The temperature of the reactor was increased to 80° C. and held at that temperature for 6 h. The reactor was then cooled to 60° C. The contents of the reactor were transferred over 15 min to a dispersion kettle containing water (1402.40 g) with stirring. MEK was then stripped from the mixture under vacuum until the MEK content was less than 2000 ppm. The resulting polymer dispersion had a solids content of 46.0% and a pH of 7.6.

Example 2—Preparation of an Acrylate Polymer Particles Functionalized with Glycidyl Methacrylate and Hosting Ditrimethylolpropane Tetraacrylate A reactor was charged with methyl ethyl ketone (MEK, 405.78 g) and heated to 80° C. with stirring. A monomer mix was prepared by combining methyl acrylate (832.80 g), methacrylic acid (117.60 g), and n-dodecylmercaptan (9.60 g) in one vessel, and an initiator mix was prepared by combining Trigonox 25C75 initiator (16.00 g) with MEK (176.00 g) in a separate vessel. The monomer and initiator mixes were charged into the reactor starting at the same time, with the monomer mix being fed over 120 min and the initiator mix being fed over 150 min. The temperature of the reactor was maintained at 80° C. over the course of the additions. Upon completion of addition of the mixes, both vessels were rinsed with MEK (64 g and 16 g for the monomer mix vessel and the initiator mix vessel, respectively), and heating of the reactor was continued for an additional 120 min at 80° C. The reactor was cooled to 70° C., at which temperature the reactor was charged sequentially with a solution of (2,2,6,6-tetramethylpiperidin-1-yl)oxyl (TEMPO, 0.48 g) in MEK (9.12 g), triethylamine (31.97 g), glycidyl methacrylate (122.40 g), then tetrabutylammonium bromide (12.19 g). The temperature of the reactor was increased to 80° C. and held at that temperature for 6 h. The reactor was then charged with ditrimethylolpropane tetraacrylate (270.78 g) and the reactor was cooled to 60° C. The contents of the reactor were transferred to a dispersion kettle containing water (1935 g) with stirring and transfer was carried out for 15 min. MEK was then stripped from the mixture under vacuum until the MEK content was less than 2000 ppm. The resulting polymer dispersion had a solids content of 43.7% and a pH of 8.2.

Comparative Example 1—Preparation of an Acrylate Polymer Hosting Multifunctional Acrylates A reactor was charged with methyl ethyl ketone (MEK, 405.78 g) and heated to 80° C. with stirring. A monomer mix was prepared by combining methyl acrylate (910.08 g), methacrylic acid (38.40 g), and pentaerythritoltetrakis(3-mercaptopropionate) (11.52 g) in one vessel and an initiator mix was prepared by combining Trigonox 25C75 initiator (16 g) with MEK (176 g) in a separate vessel. The monomer and initiator mixes were charged into the reactor starting at the same time, with the monomer mix being fed over 120 min and the initiator mix being fed over 150 min. The temperature of the reactor was maintained at 80° C. over the course of the additions. Upon completion of addition of the mixes, both vessels were rinsed with MEK (64 g and 16 g for the monomer mix vessel and the initiator mix vessel, respectively), and heating of the reactor was continued for an additional 120 min at 80° C. The reactor was cooled to 70° C., at which temperature the reactor was charged sequentially with a solution of (2,2,6,6-tetramethylpiperidin-1-yl)oxyl (TEMPO, 0.20 g) in MEK (3.72 g), triethylamine (45.15 g), Etermer EM265 multifunctional acrylate (436.35 g) and Miramer PS4350 multifunctional acrylate polyester acrylate (349.08 g). The reactor was then cooled to 60° C. and the contents of the reactor were transferred to a dispersion kettle containing water (2188.49 g) with stirring and transfer was carried out for 15 min. MEK was then stripped from the mixture under vacuum until the MEK content was less than 2000 ppm. The resulting polymer dispersion had a solids content of 50.10% and a pH of 8.2.

Comparative Example 2—ROSHIELD™ 3120 Styrene-Acrylic Emulsion

ROSHIELD™ 3120 UV Curable Styrene Acrylic Latex (a Trademark of The Dow Chemical Company or its Affiliates), which is an aqueous dispersion of GMA-functionalized polymer particles prepared by emulsion polymerization, was used in the preparation of a comparative UV-crosslinkable formulation. The latex is an aqueous dispersion of 2-stage polymer particles consisting of a highly crosslinked styrene-butyl acrylate core and a high molecular weight styrene-butyl acrylate-methacrylic acid based shell, wherein the acid groups are functionalized with GMA (0.75 equivalents, based on the shell acid groups). The free acid and GMA-functionalized groups comprise 50% by weight of the shell. The latex particles are only partly soluble in methyl ethyl ketone at all concentrations and have an indeterminate $M_n$ due to extensive crosslinking.

Preparation of a UV Curable Coating Formulation

A UV curable coating formulation was prepared as shown in Table 1. Photoinitiator refers to Darocur 1173 Photoinitiator; Wetting Agent refers to TEGO Wet 270 Wetting Agent; 346 Surfactant refers to Byk 346 Surfactant; 104DPM Surfactant refers to Surfonyl 104DPM Surfactant; DEAP refers to diethoxyacetophenone; and RM-8W Thickener refers to ACRYSOL™ RM-8W Thickener (ACRYSOL is a Trademark of The Dow Chemical Company or its Affiliates.)

TABLE 1

UV-Curable Formulation

| Formulation | (g) | (g) | (g) | (g) |
|---|---|---|---|---|
| Example 1 | 296.86 | | | |
| Example 2 | | 307.12 | | |
| Comp. Ex 1 | | | 274.61 | |
| Comp. Ex 2 | | | | 328.26 |
| Water | 70 | 59.6 | 97.22 | 48.6 |
| Photoinitiator | 1.37 | 1.34 | 1.37 | 1.35 |
| 346 Surfactant | 0.95 | 0 | 0 | 0.7 |
| Wetting Agent | 0 | 0.98 | 1.02 | 0 |
| 104DPM Surfactant | 2.09 | 2.16 | 2.2 | 1.73 |
| DEAP | 0.68 | 0.66 | 0.69 | 0.65 |
| RM-8W Thickener | 2.58 | 1.22 | 2.9 | 1.57 |

The coated samples were subjected to pencil hardness, mandrel bend, and chemical resistance evaluations. The results for pencil hardness and mandrel bend are shown in Table 1:

TABLE 1

Pencil Hardness and Mandrel Bend Results

| Ex. No. | Pencil Hardness | Mandrel Bend |
|---|---|---|
| 1 | 2H | 1/8" |
| 2 | 3H | 1/4" |
| Comp. 1 | 2H | 3/4" |
| Comp. 2 | H | 3/16" |

Coatings prepared from the composition of the present invention gave excellent pencil hardness, mandrel bend, and chemical resistance results. (Chemical resistance results were not included because they were generally excellent for all samples for the stain tested.) Pencil hardness was demonstrably better for the coating from the composition of the present invention than the coating prepared from ROSHIELD™ 3120 Latex and with comparable mandrel bend. Although not bound by theory, it is believed that the disperse particles used in the composition of the present invention, by virtue of their low molecular weight and high density of crosslinkable groups—as compared with the commercial product—give coatings with better film formation and more highly efficient crosslinking by UV irradiation; the result is a better balance of flexibility (as manifested by the mandrel bend test), hardness, warmth, and overall appearance of the coated wood. Comparative Example 1 gave equivalent pencil hardness as Example 1; however, the use of high concentrations of total MFAs (45 weight percent) contributed adversely to the mandrel bend. In contrast, Example 1, which used no MFA showed superior flexibility as evidenced by a mandrel bend of ≤1/8". Example 2, which used MFA at only 20 weight percent levels, show both superior hardness and improved mandrel bend as compared to Comparative Example 1.

The invention claimed is:

1. A method comprising the steps of: a) contacting, under free radical polymerization conditions and in the presence of an organic solvent, an acrylate monomer, a carboxylic acid monomer, and a chain transfer agent, to form a solution of a polymer having an $M_n$ in the range of from 5,000 to 50,000 Daltons; b) contacting the solution with a base and an ethylenically unsaturated glycidyl functionalized monomer to form a solution of an ethylenically unsaturated acrylate polymer; c) contacting the solution of the ethylenically unsaturated acrylate polymer with water to form an aqueous dispersion of ethylenically unsaturated functionalized acrylate polymer particles; and d) removing the organic solvent.

2. The method of claim 1 wherein the organic solvent has a boiling point of at least 70° C. and wherein the ethylenically unsaturated glycidyl functionalized monomer is glycidyl methacrylate.

3. The method of claim 2 which further comprises after step b), the step of contacting the solution of the ethylenically unsaturated functionalized acrylate polymer with a multifunctional acrylate; wherein the ethylenically unsaturated functionalized acrylate polymer particles in step c) host the multifunctional acrylate.

4. The method of claim 3 wherein the multifunctional acrylate is dipentaerythritol pentaacrylate, which is present at a concentration of from 10 to 40 weight percent based on the weight of the glycidyl methacrylate functionalized polymer particles and the multifunctional acrylate; wherein the glycidyl methacrylate functionalized polymer particles further comprise carboxylic acid groups and carboxylic acid salt groups.

5. The method of claim 4 which further comprises after step d), the step of contacting the aqueous dispersion of the glycidyl methacrylate functionalized acrylate polymer particles with an ancillary latex that is not functionalized with glycidyl methacrylate, which ancillary latex has an $M_n$ in the range of from 50,000 to 1,000,000 Daltons.

6. The method of claim 3 which further comprises after step d), the step of contacting the aqueous dispersion of ethylenically unsaturated functionalized acrylate polymer particles with a photoinitiator.

7. The method of claim 6 which further comprises after step d) the step of contacting the aqueous dispersion of ethylenically unsaturated functionalized acrylate polymer particles with one or more additives selected from the group consisting of coalescents, surfactants, defoamers, Zn salts, and rheology modifiers.

* * * * *